United States Patent Office 3,147,286
Patented Sept. 1, 1964

3,147,286
PROCESS FOR THE PREPARATION OF
HALOGENATED GLYCIDYL ETHERS
Ernst Leumann and Hans Batzer, Arlesheim, Switzerland, assignors to Ciba Limited, Basel, Switzerland, a company of Switzerland
No Drawing. Filed Sept. 12, 1961, Ser. No. 137,523
Claims priority, application Switzerland Sept. 15, 1960
1 Claim. (Cl. 260—348.6)

The present invention provides a process for the manufacture of halogenated glycidyl ethers of the general formula

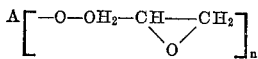

where $n$ is a small whole number and A represents an aliphatic radical with $n$ free valencies which contains at least one grouping of the formula

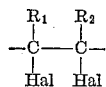

in which the two radicals Hal represent vicinal halogen atoms, more especially chlorine or bromine atoms, and $R_1$ and $R_2$ each represents a hydrogen or halogen atom or a lower alkyl radical.

According to the present process in a glycerol monohalohydrin ether or glycidyl ether of an aliphatic monoalcohol or polyalcohol that contains at least one grouping of the formula

or

where $R_1$ and $R_2$ have the above meanings, halogen is added on to the double or triple bond or bonds and then, as the case may be, the halohydrin group or groups is/are dehydrohalogenated.

Suitable unsaturated aliphatic polyalcohols from which the monohalohydrin or glycidyl ethers used as starting materials are derived are, for example:

Allyl alcohol, crotyl alcohol, propargyl alcohol, butyne-(1)-ol-(3), n-octadecene-(9)-ol-(1), butene-2-diol-1:4 and butyne-2-diol-1:4.

Preferred starting materials are glycerol monochlorohydrin ethers which are first halogenated and then dehydrohalogenated to form the corresponding glycidyl ethers. In this connection it is extremely surprising that the halogenation proceeds smoothly and is not accompanied by any noticeable side reactions; this could not have been anticipated since it is known that in general the halogenation of unsaturated glycols gives poor to unsatisfactory yields. Thus, for example, the chlorination of butyne-2-diol-1:4 leads, apart to a major proportion of resinification products, only to 35% of 2:2:3:3-tetrachlorobutane-diol-1:4.

When, instead of the monohalohydrin ether, the glycidyl ether is directly subjected to the halogenation, the yields of the final products of the invention obtained are inferior because side reactions take place that cause splitting of the epoxide ring.

The halogenation of the unsaturated monochlorohydrin or glycidyl ethers respectively is advantageously carried out by treatment of the unsaturated ether with the halogen, more especially $Cl_2$ or $Br_2$, in a suitable solvent such as carbon tetrachloride or benzene, for example at a temperature ranging from 0 to 25° C., advantageously from 5 to 15° C. The amount of halogen introduced or used from the start should be sufficient to ensure that the double or triple bond of the unsaturated ether is quantitatively saturated.

A possibly following elimination of hydrogen halide in the case of the halohydrins or chlorohydrins is carried out in known manner with a solid alkali or an aqueous alkali solution.

The halogenated glycidyl ethers, manufactured by the present process in good yields, react with the conventional curing agents for epoxy resins and can, therefore, be cured in the cold or with heating, while undergoing crosslinking, in the same manner as other polyfunctional epoxy compounds. As such curing agents there are suitable both basic and acidic compounds. Particularly good results have been obtained with: Amines and amides, such as aliphatic and aromatic primary, secondary and tertiary amines, for example mono-, di- and tri-butylamines, para-phenylenediamine, 4:4-diaminodiphenylmethane, ethylenediamine, N-hydroxyethyl-ethylenediamine, N:N-diethyl-ethylenediamine, diethylenetriamine, meta-xylylenediamine, triethylenetetramine, trimethylamine, diethylamine, triethanolamine, Mannich's bases, piperidine, piperazine, guanidine and guanidine derivatives, such as phenyldiguanidine, diphenylguanidine, dicyandiamide, formaldehyde resins of urea, melamine or aniline; polymers of aminostyrenes, polyamides, for example those of dimerised or trimerised unsaturated fatty acids and alkylene-polyamines; isocyanates, isothiocyanates, phosphoric acid, polybasic carboxylic acids and their anhydrides, for example phthalic anhydride, methylendomethylene-tetrahydrophthalic anhydride, dodecenylsuccinic anhydride, hexahydrophthalic anhydride, hexachloro-endomethylene-tetrahydrophthalic anhydride or endomethylene-tetrahydrophthalic anhydride, or mixtures thereof; maleic or succinic anhydride; polyhydric phenols, for example resorcinol, hydroquinone, quinone, phenolaldehyde resins, oil-modified phenolaldehyde resins; reaction products of aluminum alcoholates or phenolates with tautomers of the type of acetoacetic acid; Friedel-Crafts catalysts, for example aluminum chloride, antimony pentachloride, tin tetrachloride, ferric chloride, zinc chloride, boron trifluoride and complexes thereof with organic compounds; metal fluoborates, for example nickel fluoborate; boroxines such as trimethoxyboroxine. The monoglycidyl ethers of the invention by themselves likewise react with the afore-mentioned curing agents, but in most cases linear reaction products are obtained that are not cross-linked. They can be cross-linked or cured, for example, with polybasic carboxylic acids and anhydrides thereof. The term "curing" as used in this connection signifies the conversion of the glycidyl ethers into insoluble and infusible resins.

The halogenated glycidyl ethers, or their mixtures with curing agents, can be admixed at any stage prior to the curing with other flame-proofing agents such, for example, as phosphates, or with fillers, softening agents, coloring matter and similar products. Suitable extenders and fillers are, for example, asphalt, bitumen, glass fibers, mica, quartz meal, cellulose, kaolin, finely dispersed silicic acid (Aerosil) or metal powders.

The mixtures of the halogenated glycidyl ethers and the curing agents can be used without or with filters, in solution or emulsion, as textile assistants, laminating resins, lacquers, varnishes, paints, dipping or casting resins, coating compositions, pore fillers and putties, adhesives or the like, or for the manufacture of such products.

The halogenated glycidyl ethers can also be used as intermediates and as flame-proofing active diluents or modifying agents for other epoxy resins, such for example, as are obtained by reacting epichlorohydrin upon a polyhydric phenol, such as resorcinol or bis-[4-hydroxyphenyl]-dimethylmethane, in an alkaline medium.

In the following examples parts and percentages are by weight, and the relationship between part by weight and part by volume is the same as that between the kilogram and the liter. The epoxide contents shown as "epoxide equivalents per kg." have been determined by the method described by A. J. Durbetaki in "Analytical Chemistry," volume 28, No. 12, December 1956, pages 2000–2001, with hydrogen bromide in glacial acetic acid.

*Example 1*

A reaction vessel equipped with stirring means, thermometer, dropping funnel and cooling bath is charged with 273 parts (1 mol) of butene-2-diol-1:4-bis-(α-mono-chlorohydrin)ether in 100 parts by volume of carbon tetrachloride. In the course of 30 minutes at 10 to 15° C. a solution of 160 parts of bromine (1 mol) in 200 parts by volume of carbon tetrachloride is added dropwise. While thoroughly cooling the reaction mixture, it is treated dropwise with 240 parts (3 mols) of sodium hydroxide solution of 50% strength, allowing the temperature to rise to 50° C. towards the end of the dropwise addition. The mixture is stirred for 30 minutes without heating it (with the temperature dropping to 35° C.), then cooled and mixed with 300 parts by volume of water to dissolve the precipitated sodium chloride. The organic phase is separated dried over calcium chloride and freed from the solvent. Yield: 262 parts of a light-brown, thinly liquid oil containing, per kg. 5.49 epoxide equivalents and 5.25 equivalents of bromine; this product consists predominantly of the dibrominated butene-2-diol-1:4-diglycidyl ether of the formula

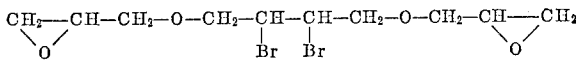

When this compound is cured in admixture with 30% of a polyglycidyl ether (containing 5.3 epoxide equivalents per kg.; liquid at room temperature; obtained by alkaline condensation of epichlorohydrin with 2:2-bis-(para-hydroxyphenyl)-propane) and 15% of trixylenylphosphate, with 0.2 mol of diethylenetriamine per equivalent of epoxide groups for 24 hours at room temperature, castings are obtained which have a VDE-flammability value of 0 second.

*Example 2*

200 parts (1 mol) of butene-2-diol-1:4-diglycidyl ether are dissolved in 300 parts by volume of benzene in the apparatus used in Example 1, and in the course of 1½ hours at 5 to 10° C. 71 parts (1 mol) of chlorine are injected into this solution. The solvent is then evaporated under vacuum, and there are obtained 270 parts of a viscous, yellow product which consists predominantly of the dischlorinated butene-2-diol-1:4-diglycidyl ether of the formula

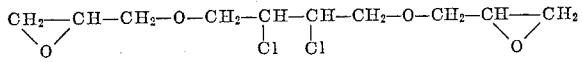

*Example 3*

134.5 parts (0.5 mol) of butyne - 2-diol-1:4-bis(α-monochlorohydrin)ether are dissolved in 150 parts by volume of benzene in the apparatus used in Example 1. Within 2½ hours 67.5 parts (0.95 mol) of chlorine are injected at 8 to 10° C. and, while continuing the cooling, 40 parts (1 mol) of powdered caustic soda are added in portions, while maintaining the temperature at 30 to 40° C. The mixture is stirred on for 30 minutes at 50° C., then cooled, diluted with 100 parts by volume of benzene, and the sodium chloride formed is dissolved by adding 200 parts by volume of water. The organic phase is isolated and evaporated under vacuum, to yield 154.5 parts of a yellow-brown viscous product containing 2.16 epoxide equivalents per kg. and 42.8% of chlorine. This product consists predominantly of the tetrachlorinated butyne-2-diol-1:4-diglycidyl ether of the formula

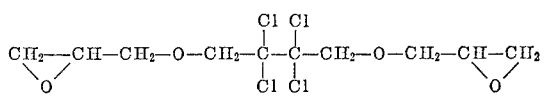

What is claimed is:

A process for the preparation of glycidyl ether of the formula

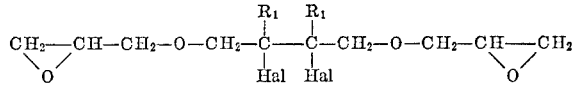

wherein $R_1$ is a member selected from the group consisting of hydrogen, chlorine and bromine atom, and "Hal" is a member selected from the group consisting of chlorine and bromine atom, which comprises treating a chlorohydrin ether of the formula

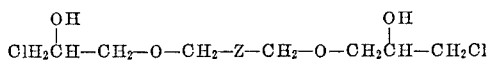

wherein Z is a member of the group consisting of the radical $-C\equiv C-$ and the radical $-CH=CH-$, with a halogen selected from the group consisting of $Cl_2$ and $Br_2$ in sufficient quantity to convert the unsaturated carbon to carbon bond in the radical Z into a saturated carbon to carbon bond at a temperature ranging from about 0° C. to about 25° C. in an inert organic solvent, thereby producing a chlorohydrin ether of the formula

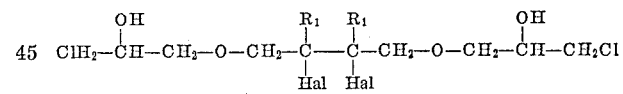

wherein $R_1$ and Hal have the meanings assigned to them above, and then treating the thus formed chlorohydrin ether with alkali to dehydrohalogenate the same and provide said glycidyl ether.

References Cited in the file of this patent

UNITED STATES PATENTS

| | | |
|---|---|---|
| 2,314,039 | Evans et al. | Mar. 16, 1943 |
| 2,792,381 | Shokal et al. | May 14, 1957 |
| 2,951,854 | Chiddix et al. | Sept. 6, 1960 |
| 2,981,754 | Wynn | Apr. 25, 1961 |